United States Patent [19]

Ashcraft

[11] Patent Number: 4,472,330
[45] Date of Patent: Sep. 18, 1984

[54] SYSTEM AND PROCESS FOR SIMULTANEOUSLY ORIENTING THE FILMS OF A FILM LAMINATE

[75] Inventor: Charles R. Ashcraft, Victor, N.Y.

[73] Assignee: Mobil Oil Corporation, New York, N.Y.

[21] Appl. No.: 454,208

[22] Filed: Dec. 29, 1982

[51] Int. Cl.³ .................. B29H 5/26; B29C 19/02; B29C 31/00; B32B 31/00
[52] U.S. Cl. ................................. 264/26; 156/229; 156/272.2; 156/244.17; 156/244.24; 264/288.4; 264/290.2
[58] Field of Search .............. 156/229, 244.24, 496, 156/272.6, 244.17, 272.2; 264/26, 288.4, 290.2

[56] References Cited

U.S. PATENT DOCUMENTS

| 4,022,646 | 5/1977 | Casey | 156/229 |
| 4,274,900 | 6/1981 | Mueller et al. | 156/229 |
| 4,311,660 | 1/1982 | Barham et al. | 156/229 |
| 4,373,002 | 2/1983 | Petersen | 156/244.24 |

FOREIGN PATENT DOCUMENTS 1127076  9/1968  United Kingdom ............... 204/168

Primary Examiner—Edward C. Kimlin
Assistant Examiner—Merrell C. Cashion
Attorney, Agent, or Firm—Alexander J. McKillop; Michael G. Gilman; James P. O'Sullivan

[57] ABSTRACT

A method and system are disclosed for orienting a multilayer polymeric film structure by differentially heating different film layers thereof by dielectric heating and then molecular orienting the film layers at their respective optimal orientation temperatures.

6 Claims, No Drawings

SYSTEM AND PROCESS FOR SIMULTANEOUSLY ORIENTING THE FILMS OF A FILM LAMINATE

The present invention relates to the orientation of multilayer films. More particularly, the invention relates to the orientation of polymer films having different optimum orientation temperatures.

The uniaxial and biaxial orientation of plastic products is a common commercial operation. Such orientation improves the physical properties of plastics such as, flexibility, Elmendorf tear strength, elongation, tensile-strength, Mullen burst strength, impact strength and cold strength properties. The desired orientation is accomplished by subjecting the polymeric film to longitudinal and/or transverse tensile stress at a temperature somewhat above the second order transition temperature or the glass transition temperature thereof. A problem is encountered when orienting a multi-layer film structure of different polymeric films, for example, a film composed of a polethylene layer bonded by an adhesive to a polyvinylidene chloride film which in turn is adhesively bonded to a second polyethylene film. The core layer, i.e. the polyvinylidene chloride film, has a higher softening point than the polyethylene film and, thus, the structure must be heated above the ideal or optimum orientation temperature for the polyethylene film. On orientation this will result in either a hazy film with less than optimum physical properties or a film with little or no orientation or, worst case, being a non-processible film, which is to say, a film so hot that it splits during orientation, resulting in no film at all.

It is, therefore, an object of this invention to provide a method and system for orienting multi-layer films having at least two layers each of which are optimally orientable at different temperatures.

It is another object of the present invention to provide a method and system for biaxially orienting multi-layer films whose layers are individually orientable at different temperatures.

SUMMARY OF THE INVENTION

This invention relates to a system for orienting a multi-layered film structure of (1) at least one polymeric layer optimally orientable at a comparatively low temperature and (2) at least one other polymeric layer optimally orientable at a comparatively higher temperature and being capable of being heated to said higher temperature by dielectric heating means; said system comprising in combination:
(a) means in association with said film structure for heating said structure to said comparatively low temperature;
(b) dielectric generated heating means in association with said film structure adapted to heat said layer (2) to said comparatively higher temperature while not substantially, directly increasing the temperature of layer (1); and
(c) means in association with said film structure for orienting said structure while a temperature differential exists between said layer (1) and layer (2), said differential being of a magnitude at least generally corresponding to that between said comparatively low and said comparatively higher temperatures.

The invention also relates to a system for biaxially orienting the above identified multi-layered film structure; said system comprising in combination:

(a) first heating means in association with said film structure for heating said structure to a first comparatively low temperature;
(b) first dielectric generated heating means in association with said film structure adapted to heat said layer (2) to a first comparatively higher temperature while not substantially, directly increasing the temperature of layer (1);
(c) first orienting means in association with said film structure for uniaxial or machine direction orienting said structure while a temperature differential exists between said layer (1) and layer (2), said differential being of a magnitude at least generally corresponding to that between said first comparatively low and said first comparatively higher temperatures;
(d) second heating means in association with said film structure for heating said structure to a second comparatively low temperature;
(e) second dielectric generated heating means in association with said film structure adapted to heat said layer (2) to a second comparatively higher temperature while not substantially directly increasing the temperature of layer (1);
(f) second orienting means in association with said film structure for biaxial or transverse direction orienting said structure while a temperature differential exists between layer (1) and layer (2), said differential being of a magnitude at least generally corresponding to that between said second comparatively low and said second comparatively higher temperatures.

The invention also relates to a process for biaxially orienting the above identified multi-layer structure comprising:
(a) preparing the multi-layered structure comprising said layer (1) and layer (2) in association with each other;
(b) heating said structure to a first comparatively low temperature;
(c) while at said low temperature subjecting said structure to dielectric heating generated to heat said layer (2) to a first comparatively higher temperature while not substantially, directly increasing the temperature of layer (1);
(d) while a temperature differential exists between said layer (1) and layer (2), uniaxially or machine direction orienting said structure; said differential being of a magnitude at least generally corresponding to that between said first comparatively low and said first comparatively higher temperatures;
(e) heating said structure to a second comparatively low temperature;
(f) while at said low temperature subjecting said structure to dielectric heating to heat said layer (2) to a second comparatively higher temperature while not substantially directly increasing the temperature of layer (1); and
(g) while a temperature differential exists between said layer (1) and layer (2) biaxially or transverse direction orienting said structure, said differential being of a magnitude at least generally corresponding to that between said second comparatively low and said second comparatively higher temperatures.

In one preferred embodiment of the invention at least one film of said structure is at least substantially free of polar substituents and at least one other film of said structure contains at least a substantial number of polar substituents. The polar free film can be a polyolefin, for example, polyethylene. The other film or films can be a thermoplastic film containing polar substituents.

DETAILED DESCRIPTION OF THE INVENTION

In coping with the problem addressed by the present invention, that is, the fact that some polymers have an ideal orientation temperature considerably lower than other films, this poses a dilemma when it is desired to simultaneously orient a multilayer structure composed of such polymers. The dilemma is solved, according to the present invention, by taking advantage of the observation that dielectric heating energy will cause some polymers to increase in temperature quite rapidly while other polymers will heat, under the same conditions, at best, only slowly. This observation will permit, for example, a dual layer laminate of a polymer which will not respond rapidly to dielectric heating and a polymer which will respond rapidly by increasing in temperature, to be uniaxially and biaxially oriented while each polymer is at a temperature which is optimal for its orientation. In order to accomplish this result the laminate is first heated to a temperature which is the optimum temperature for uniaxial or machine direction orientation of one of the polymers and while at this temperature the other film is heated by dielectric heating. The laminate is then uniaxially oriented. Thereafter, the temperature of this laminate is brought to or maintained at a temperature which is optimum for the biaxial orientation of the polymer which will not rapidly respond to dielectric heating and while at this temperature the laminate is subjected to sufficient dielectric heating to raise the other polymer to a temperature which is optimum for its biaxial orientation. When both layers are at these temperatures, the film is then biaxially oriented and thereafter cooled to below these temperatures.

Dielectric heating as employed herein is understood to mean heating the polymer films by placing them in a radio-frequency electric field. The films to be heated are positioned between flat or contoured electrodes which are connected to an oscillator which produces radio frequency waves in the range of from 1 hertz to 100 megahertz with the electrodes at a potential of about 1 to 20 kilovolts. Some of the energy of the electric field between the electrodes is absorbed by the polymers but to a different degree in each polymer. This facilitates bringing the different polymer layers to their respective orientation temperature. Conventional radient heat from, for example, resistors can heat a laminate to the orientation temperature of one layer and dielectric heating can produce a temperature differential between the layers by only heating, or by heating to a greater extent, the other polymer. Thus, one film is actually, or in effect, not directly heated by the dielectric heating means. The temperature of this one layer may be to some extent affected by its physical association with the layer heated by dielectric heating but this can be taken into consideration in preheating the laminate and in judiciously establishing the necessary optimum orientation temperature differential.

Dielectric heating could also be employed at microwave frequencies, i.e. up to several thousand megahertz, by modifying the systems so as to employ a resonant cavity. This is not to be confused with microwave heating employing the use of a wave guide or other microwave applicator.

It has been determined that the power requirements for heating certain polar substituent-containing polymer films to orientation temperature are well within the range of dielectric heating systems. Any suitable dielectric heating apparatus or system can be employed for establishing the temperature differential between associated polymers in the composite structures of the present invention. For example, after a conventional oven or heat chamber heats the film to a first temperature, which is the optimum orientation temperature for a nonpolar polymer layer of the film, the film can be passed through a dielectric heating apparatus such as a Model CP1O-B, equipped with a 3.7 Kw power source, available from Thermex Inc., Bay Shore, N.Y. The film is then uniaxially oriented using any suitable means, e.g. differential speed rollers which can stretch the films up to 5 times and more. Thereafter, the film is heated to the optimum biaxially orientation temperature of the nonpolar layer in a heat chamber and then the temperature differential for biaxial orientation established by means of the dielectric heating apparatus. Biaxial orientation is immediately effected by any suitable means, e.g. a T.M. Long orienter, followed by cooling.

It has been determined that 8 Kw of power can heat a 0.8 mil polyvinylidene chloride layer in a 30 inch wide web travelling at 500 feet/minute to a temperature which is 30° F. above of that of a polyethylene web bonded thereto. This temperature differential will permit the biaxial orientation of both layers at their respective optimal orientation temperatures.

This is illustrated by the following examples.

EXAMPLE I

A five layer, 30 inch wide film is prepared composed of (1) a 14 mil film of polyethylene homopolymer, (2) a 1.8 mil layer of CXA 3101 adhesive, an ethylene-vinyl acetate terpolymer from DuPont Co., (3) a 3.5 mil film of polyvinylidene chloride (4) a 1.8 mil layer of CXA 3101 adhesive and (5) a 14 mil layer of polyethylene homopolymer. This film is machine direction (MD) oriented at a temperature of about 210° F. using differential speed rollers to produce an MD stretching of 5 times. The MD oriented laminate is then transverse direction (TD) oriented 7 times on a T.M. Long orienter at a temperature of about 230° F. The resulting product will evidence haziness, some holes, thick and thin spots, and, overall, less than optimum physical properties.

EXAMPLE II

A film identical to that in Example I is MD oriented 5 times at 210° F. This film, while preheated to a temperature range of about 215° F., (a suitable temperature for TD orientation of polyethylene) is passed through a dielectric heating apparatus of 8 Kw output. The dielectric heating energy is applied for 2 seconds which is sufficient to raise the polyvinylidene chloride film to about 230°-260° F., which is a suitable TD orientation temperature. The laminate is immediately TD oriented on a T.M. Long orienter to an extent of 7 times. The resulting laminate will evidence excellent biaxial orientation and optimum physical characteristics.

It is to be understood that in the foregoing example the uni-directional or machine direction orientation can be accomplished by first heating the laminate, for example, by radiant heat to a temperature which is optimal for the uniaxial orientation of the polyethylene layer and thereafter while at this temperature the dielectric heating unit can be employed to optimally heat the polyvinylidene chloride layer to its uniaxial orientation temperature.

In the laminate contemplated by the present invention for biaxial orientation, any orientable film which does not readily increase in temperature in response to dielectric heating energy is contemplated as at least one of the layers thereof. Examples of such films include polyolefin films, e.g. polyethylene, polypropylene, polybutylene, and olefin copolymers, such as, ethylene-propylene copolymers. Any film which is biaxially orientable and which will readily respond to the energy generated by a dielectric heating unit so as to rapidly increase in temperature is contemplated for the other layer of the structures of the invention. Broadly, any polymer containing polar substituents which will respond to such energy and cause the film to rapidly increase in temperature is contemplated. Examples of such films include polyvinylidene chloride, polyvinylalcohol polymers, ethylene-vinylalcohol copolymers, polyamides, polyethers, polyesters, etc.

It also is contemplated to employ film laminates which respond to dielectric heating energy with an increase in temperature and exhibit a differential in temperature between that of each film, each film being at a temperature which is optimum for its orientation. Thus, the structures to be oriented include laminates of non-polar films with polar films and, in some instances, polar films with polar films.

What is claimed is:

1. The process for orienting a layered structure comprising:
   (a) preparing a multi-layered structure comprising (1) at least one polymeric layer optimally orientable at a first temperature and in association therewith (2) at least one other polymeric layer optimally orientable at a second temperature higher than said first temperature, and being capable of being heated to said second higher temperature by dielectric heating means;
   (b) heating said structure to said first temperature;
   (c) while at said first temperature subjecting said structure to dielectric heating to heat said other polymeric layer to said second temperature; and
   (d) while a temperature differential exists between said layer (1) and layer (2), orienting said structure; said differential being of a magnitude at least generally corresponding to that between said first and second temperatures.

2. The process for biaxially orienting a multi-layer structure comprising:
   (a) preparing a multi-layer structure comprising (1) at least one polymeric layer optimally orientable at a first temperature and in association therewith (2) at least one other polymeric layer optimally orientable at a second temperature higher than said first temperature, and being capable of being heated to said second higher temperature by dielectric heating means;
   (b) heating said structure to said first temperature;
   (c) while at said first temperature subjecting said structure to dielectric heating to heat said layer (2) to said second temperature while not substantially directly increasing the temperature of layer (1);
   (d) while a temperature differential exists between said layer (1) and layer (2), uniaxially orienting said structure, said differential being of a magnitude at least generally corresponding to that between said first and said second temperatures;
   (e) heating said structure to a third temperature;
   (f) while at said third temperature subjecting said structure to dielectric heating to heat said layer (2) to a fourth temperature higher than said third temperature while not substantially directly increasing the temperature of layer (1); and
   (g) while a temperature differential exists between said layer (1) and layer (2) biaxially orienting said structure, said differential being of a magnitude at least generally corresponding to that between said third and said fourth temperatures.

3. The process of claim 2 wherein layer (1) is at least substantially free of polar substituents and layer (2) contains at least a substantial number of polar substituents.

4. The process of claim 3 wherein layer (1) is a polyolefin and layer (2) is a thermoplastic polar substituent-containing polymer.

5. The process of claim 4 wherein layer (2) is a member selected from the group consisting of polyvinylidene chloride, polyvinyl alcohol, an ethylene-vinyl alcohol copolymer, a polyamide, a polyether and a polyester.

6. The process of claim 5 wherein said structure is bonded together by means of at least one adhesive layer.

* * * * *